Dec. 2, 1952 E. W. WERTS 2,620,135
BALANCED RESISTANCE TYPE TEMPERATURE CONTROL APPARATUS
Filed Dec. 28, 1948 5 Sheets-Sheet 1

Inventor:
Everett W. Werts,
By Chritton, Schroeder,
Merriam & Hofgren, Attys.

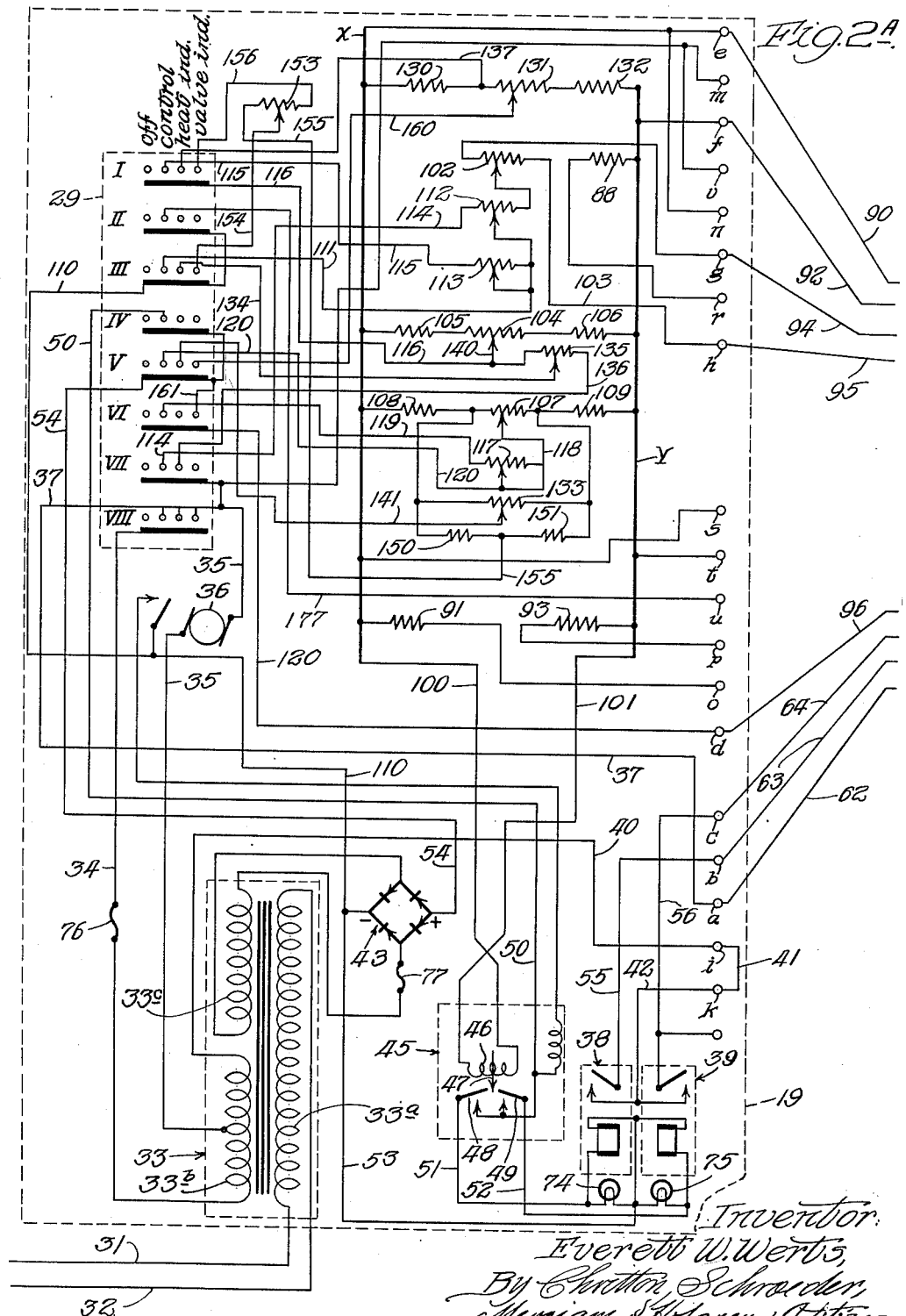

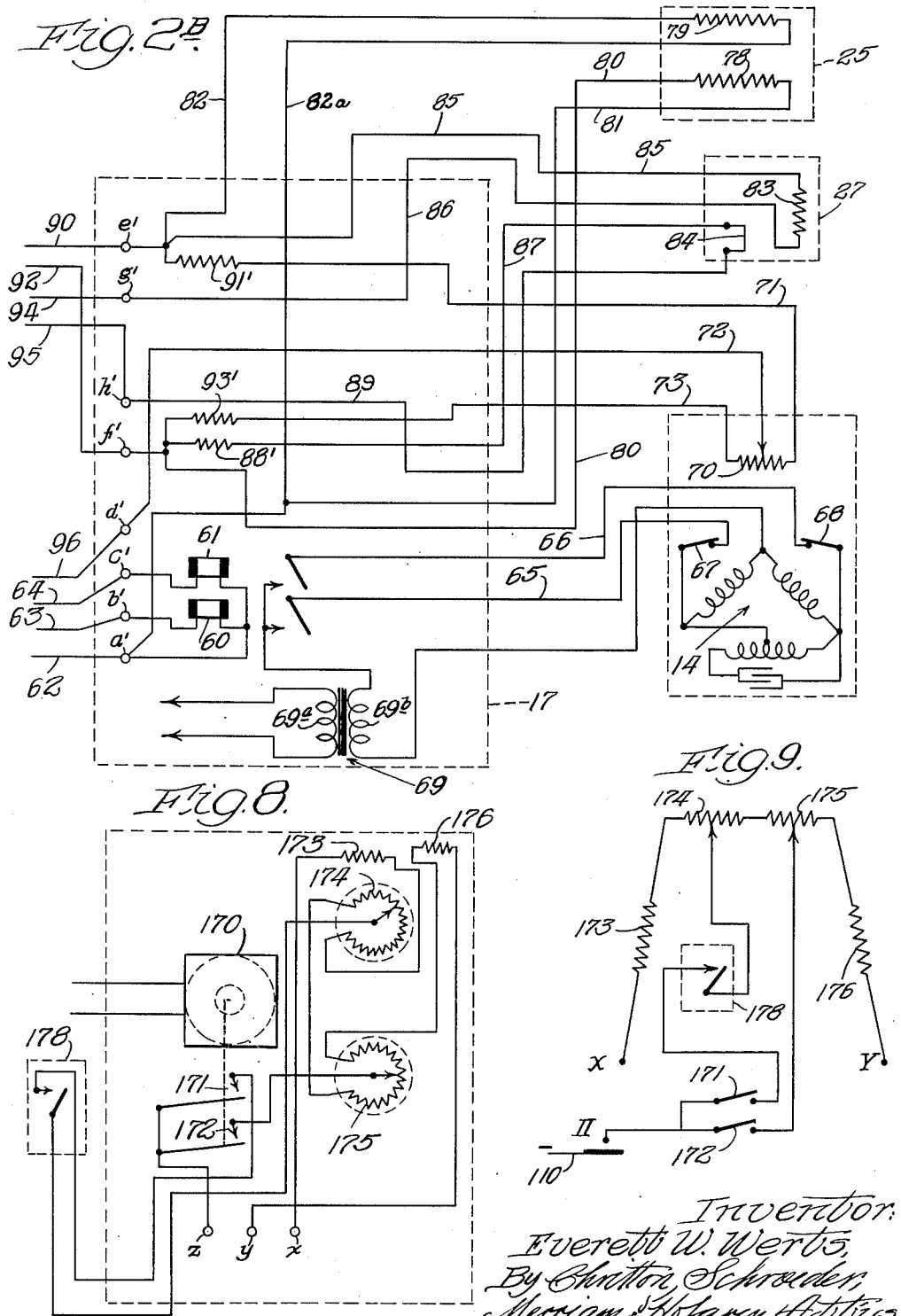

Dec. 2, 1952  E. W. WERTS  2,620,135
BALANCED RESISTANCE TYPE TEMPERATURE CONTROL APPARATUS
Filed Dec. 28, 1948  5 Sheets-Sheet 4
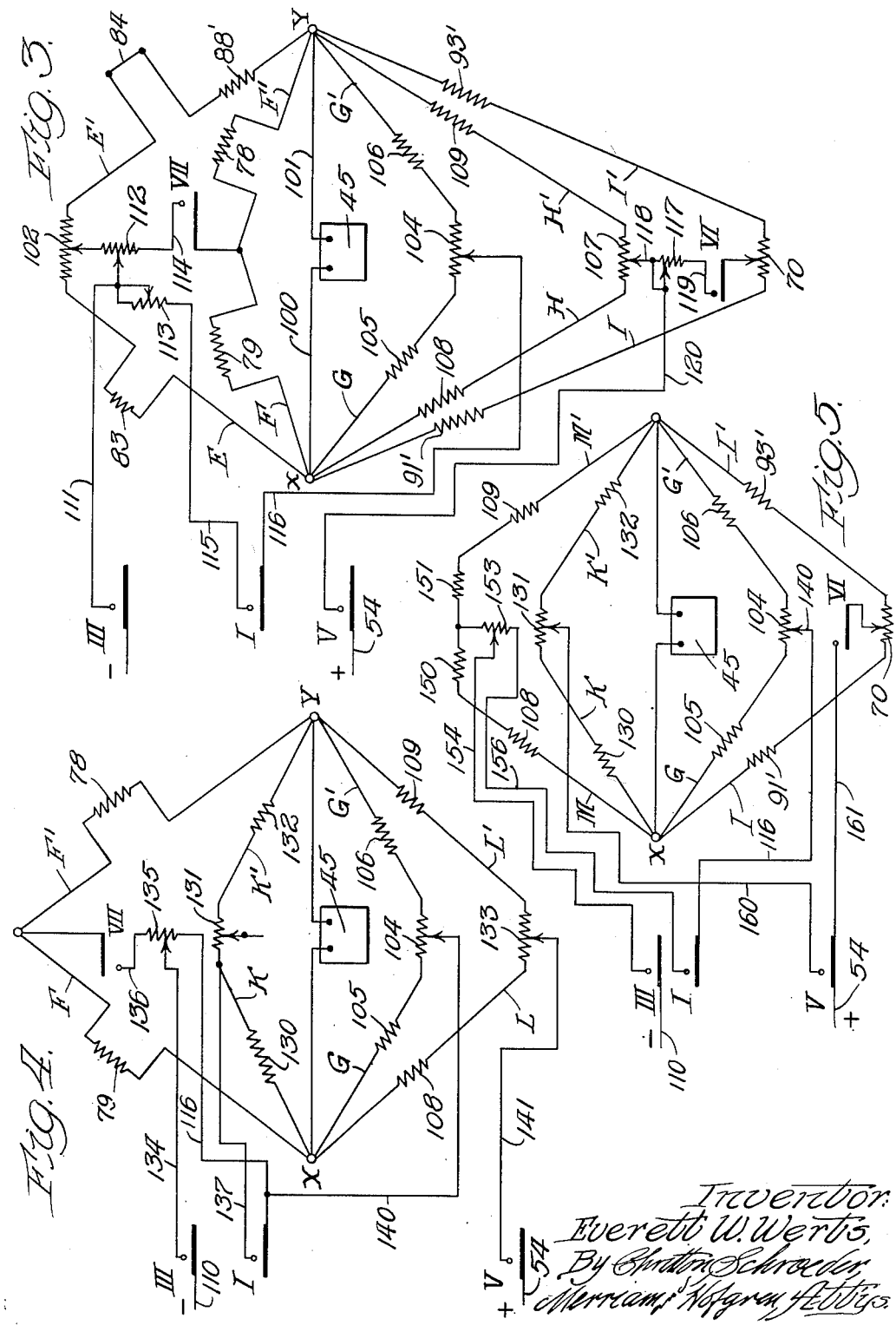

Dec. 2, 1952          E. W. WERTS          2,620,135

BALANCED RESISTANCE TYPE TEMPERATURE CONTROL APPARATUS

Filed Dec. 28, 1948          5 Sheets-Sheet 5

Inventor:
Everett W. Werts,
By Chritton, Schroeder,
Merriam, & Hofgren, Attys

Patented Dec. 2, 1952

2,620,135

UNITED STATES PATENT OFFICE 2,620,135

BALANCED RESISTANCE TYPE TEMPERATURE CONTROL APPARATUS

Everett W. Werts, Michigan City, Ind., assignor to C. A. Dunham Company, a corporation of Iowa Application December 28, 1948, Serial No. 67,588

12 Claims. (Cl. 236—46)

This invention relates to balanced resistance type temperature control apparatus, and more particularly to improved aparatus of this type utilizing one or more condition responsive elements operating on the resistance thermometer principle as parts of an impedance network or bridge circuit which is adapted for use in a wide variety of types of buildings and under varying installation conditions.

This invention comprises certain improvements in the apparatus disclosed in Patents 2,362,977 and 2,431,790 issued on joint inventions of David N. Crosthwait, Jr., and Everett W. Werts on November 21, 1944, and December 2, 1947, respectively, and the present application will be directed to a full disclosure of the improvements, the aforesaid patents being relied upon to complete the detailed disclosure of the principle of operation and general function of such a system.

Apparatus operating on the resistance thermometer principle is extremely sensitive and responds to very minute electrical unbalances. Consequently, control systems operating on this principle were formerly generally unreliable unless confined to laboratory use or other applications where they might be installed, operated and maintained by skilled instrument technicians. However, for successful application to building temperature control the equipment must be constructed and arranged so that it may be installed, operated and maintained by relatively unskilled persons who are not thoroughly familiar with the operating principle of such systems, as for example journeyman workers in the building trades and heating system operators. The control systems disclosed in the above mentioned patents provide a construction and arrangement wherein a balanced resistance or resistance thermometer type temperature control system is so constructed and arranged that it may be installed and operated by relatively unskilled personnel. The present application is directed to an improved and simplified system.

The efficient operation of a heating system requires that the operation of the temperature control equipment be accessible to and under the supervision of the heating system operators. However, certain of the condition responsive elements must be located at points where they are under the influence of the control conditions. Thus, the portions of the system which require manipulation during the operation of the system are preferably located in the boiler room or at some other central point while the condition responsive devices must be located in the apartments or other spaces where the temperature is to be controlled. With this arrangement various impedances constituting elements of the control system are located at remote points and long distances from one another. As is well known, in resistance or other impedance bridges which have condition responsive impedances located considerable distances from one another or from other elements of the bridge circuit allowance must be made for the resistance of the leads which connect the impedances or other elements with one another and for possible variations in such resistance, and balancing leads are customarily provided for this purpose. For example, the lead from the central control point to a remote condition responsive element might pass through varying conditions of temperature so that unless a compensating lead is provided which passes through the same varying conditions the bridge may become unbalanced without reflecting the true conditions at the space to be controlled, and a resistance equal to the nominal resistance of the lead which extends to the condition responsive impedance would not be operable to compensate for variations in lead resistance caused by changing temperatures, etc.

When the requirements of the particular system are such that one or more condition responsive elements must be located a long distance from the central controlling point the total quantity of wire required by the leads to the condition responsive elements and by compensating leads may be so great as to result in costs which offset admitted advantages of a system of this type. For example, in certain installations, particularly in housing where many units are supplied with steam or other heating medium from a central source and the temperature control panel must be so located that it is under the supervision of an operating staff, many miles of wire must be provided and usually the costs are additionally increased by codes or other regulations requiring conduits of certain specifications. It is highly important, therefore, to provide a control system which is capable, if required, of using a minimum number of conductors to connect the various elements to complete the installation without losing the effect of lead compensation.

In systems heretofore known, such as those disclosed in the aforesaid patents, two conductors were required between each of the distantly located condition responsive elements and the centrally located control panel and two additional conductors were needed as compensating leads. In many instances this construction necessitated the use of an excessive amount of wiring. For example, in such installations frequently the condition responsive elements were 5,000 feet or more distant from the panel. In the construction shown in Patent No. 2,431,790 for example, a total of 14 leads are required between the space to be heated and the control panel, and if each of these leads were about 5,000 feet long a total of 70,000 feet of wire would be required.

With the improved arrangement here disclosed and claimed a similar control system may utilize only eight leads, thus resulting in a great saving in cost while at the same time retaining all of the calibrating and operating adjustments at the control panel.

A further disadvantage in the systems disclosed in the aforesaid patents results from the use of potentiometers in the arms of certain of the bridge circuits, and in the use of double potentiometers. Since the bridge is very sensitive to any small electrical unbalance it sometimes happens that small resistances due to corrosion, loose contact, etc. at the point of contact between the sliding arm of the potentiometer and the resistor portion of the potentiometer upset the bridge balance when the potentiometer is in a bridge arm, and upset the operation of the system when double potentiometers are operated by means of a single control, since each unit of the double potentiometer often develops a different resistance than that developed by the other potentiometer. The present invention eliminates the use of potentiometers in the bridge arm and eliminates the use of double potentiometers so that there is no possibility of unbalance occurring because of varying resistances in the sliding contacts of the potentiometers in the system.

In view of the foregoing, one feature of this invention is that it provides an arrangement wherein pairs of impedance bridge arms, forming bridge branches, are located remote from the other branches of the bridge and these remote arms are interconnected and the effects of lead compensation are obtained with fewer connecting wires from the remote arms to the other branches than in previous bridge circuit arrangements; the need for separate compensating leads being eliminated; another feature of this invention is in an improved arrangement of bridge branch elements in the central control panel and at points remote from said panel whereby said elements, in combination with the conductors connecting the panel and the remote points, form bridge branches which complete the bridge; a further feature of this invention is in the provision of an arrangement wherein power leads concurrently comprise a part of the impedance bridge; an additional feature of this invention is that said conductors in the circuit act as junctions of bridge branches and in so doing preserve the effects of lead compensation while doing away with the necessity of providing certain separate compensating leads; still another feature of this invention is that it provides a system of the character described wherein double potentiometers are eliminated and there are no potentiometers in the bridge arms; and yet a further feature of this invention is that it provides an improved time switch arrangement for use with temperature control apparatus.

Other features and advantages of this invention will be apparent from the following specification and from the drawings in which:

Fig. 1 is a diagrammatic representation of a heating system with the improved control apparatus incorporated therein;

Fig. 2, comprising the portions 2A and 2B, is a schematic wiring diagram of the improved portion of the control system, in which Fig. 2A includes the elements at the central control panel and Fig. 2B includes the elements remote from said central control panel;

Fig. 3 is a schematic diagram of the main Wheatstone bridge used for automatic control of the system (the elements of which are also shown in Fig. 2) but with the arrangement of the wiring somewhat simplified to provide a better indication of the several bridge branches and arms;

Fig. 4 is a schematic diagram similar to Fig. 3, but illustrating a different bridge arrangement utilized to determine the percentage of heat output of the system;

Fig. 5 is a schematic diagram similar to Figs. 3 and 4 but illustrating a different bridge arrangement utilized to determine the percentage of control valve opening in the system;

Fig. 8 is a schematic wiring diagram of a time switch for use with the control system; and Fig. 9 is a schematic diagram of the time switch circuit arranged as a branch for a Wheatstone bridge.

Figure 1:
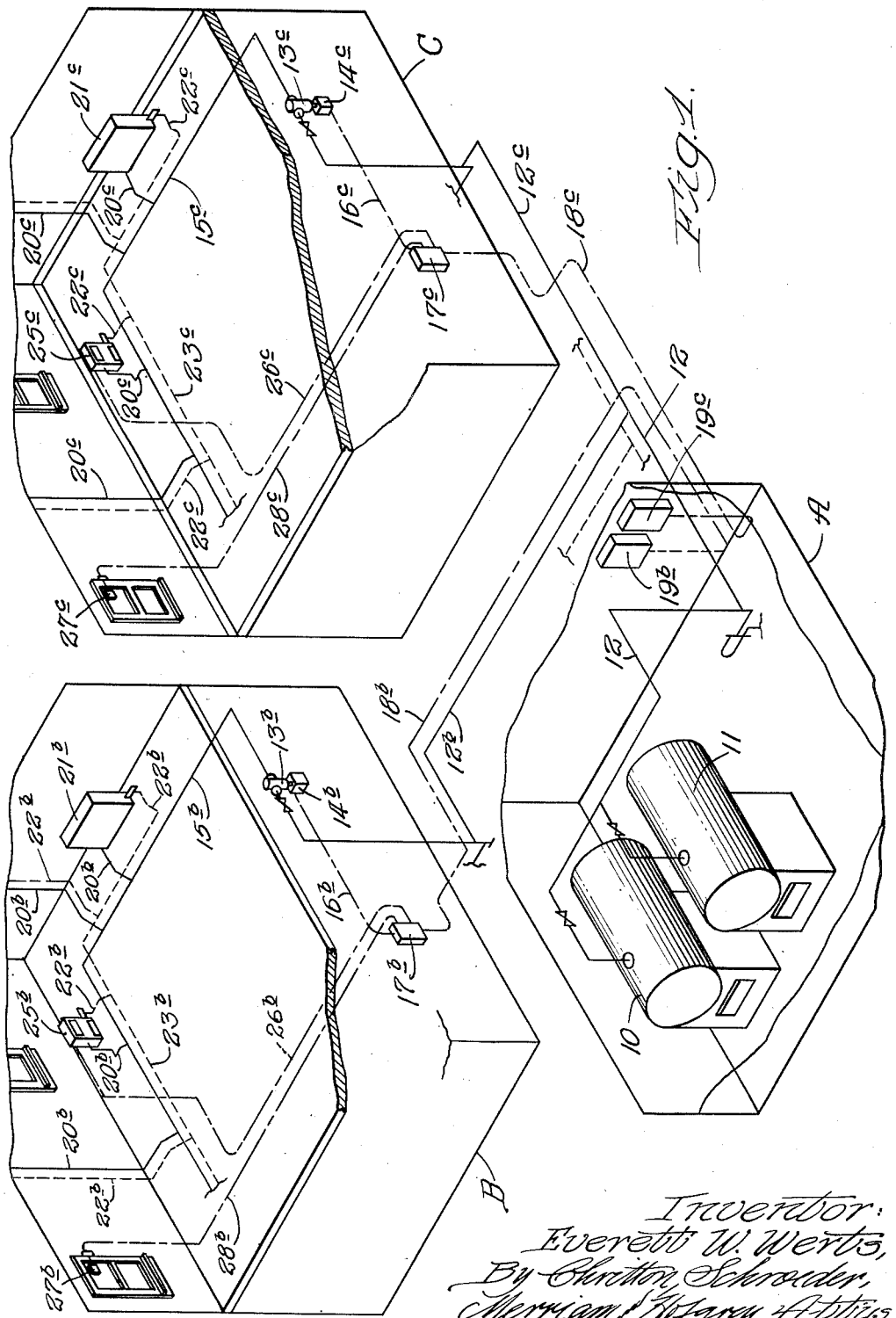

Referring now more particularly to the drawings, and specifically to Fig. 1, this figure illustrates the application of the improved control system to a heating system for a plurality of housing units. Unit A is a boiler plant having therein boilers or generators 10 and 11 which supply steam at sufficiently high pressure to a main 12 extending from unit A toward the various housing units, examples of which are shown at B and C. A branch main 12b extends into the housing unit B and the steam under pressure is supplied to a control or reducing valve 13b which is operated by a motor assembly generally indicated at 14b which automatically modulates the valve 13b to establish a controlled flow of steam at reduced pressure through a supply main 15b. The conduit wires for the motor mechanism 14b are contained in a cable 16b which extends to a terminal box 17b, and a cable 18b extends from the terminal box to a control panel 19b in the boiler room. Steam flows from the supply main 15b through risers 20b to the individual radiators, as radiator 21b, of the unit B, these radiators being provided with outlet traps through which condensate and air are drawn out through pipes 22b to a return main 23b extending to an exhauster mechanism, not shown. The exhauster mechanism is described in the aforesaid patents and will not be described again here except to say that such mechanism functions to maintain a desired vacuum in the radiators and the returns and to carry the condensate back to the generators 10 and 11.

A "heat balancer," shown at 25b, is provided for measuring the heat output of the heating system. This device comprises a small convector type radiating unit enclosed in a casing and includes an arrangement whereby air may flow in through a lower grille and out through an upper grille. As described in the earlier mentioned patents, thermostatic elements (shown at 78 and 79 in Fig. 2) are contained within the heat balancer to determine the difference in temperature which the air undergoes as it passes through the unit, these thermostatic elements being connected to the terminal box 17b by means of a cable 26b.

A "window selector" 27b, which includes an element (83 in Fig. 2) responsive to changes in outside as well as in inside temperatures, is mounted on the inside surface of a window in the unit B and is connected by means of a cable 28b to the terminal box 17b.

The housing unit C (as well as any other housing or similar units which might be in the system) contains a like arrangement of heating and control elements, the unit C being supplied with steam under pressure through the main 12c, this steam being controlled by means of a valve 13c operated by a motor mechanism 14c, and said valve being adapted to supply steam at reduced pressure to a heating main 15c. The motor mechanism is controlled through leads in a cable 16c which extends to a terminal box 17c, the terminal box being connected through a cable 18c to another control panel 19c in the boiler plant. Risers 20c connect the main 15c with radiators 21c and exhaust pipes 22c connect with a common exhaust return 23c which in turn is connected to the exhauster apparatus. A heat balancer 25c is provided and the thermostatic elements contained therein are connected with the terminal box 17c by means of a cable 26c; while a selector device 27c is mounted on the inside surface of a window pane and is connected with the terminal box by means of a cable 28c.

Since the control system elements found in unit B are similar to those found in unit C, in Fig. 2 these units are designated by the same reference character but without the subscript inasmuch as the apparatus of Fig. 2 may comprise the control system for either unit. Brief reference to Fig. 2 will show the control panel 19 in Fig. 2A and the terminal box 17, the motor 14, the heat balancer 25 and the selector 27 in Fig. 2B. The motor 14, heat balancer 25 and selector 27 are also shown connected to the terminal box 17.

*Power circuits and general operation*

The general mode of operation of the improved system is similar to the system disclosed in Patent 2,431,790 earlier referred to. The entire system is under the control of a master switch 29 shown in Fig. 2A and having a control knob for the operation thereof as shown at 30 in Fig. 6. The master switch is of conventional construction and comprises eight decks which are ganged for simultaneous operation through the control knob 30. These decks are labeled with Roman numerals in Fig. 2A and each deck comprises a common or primary terminal and a plurality of secondary terminals. Manipulation of the knob 30 simultaneously connects a selected one of the secondary terminals of each deck with the respective common or primary terminal of each deck. While only four secondary terminals are shown on each deck of the switch in Fig. 2A since the circuits associated with these terminals include all the improvements claimed in this application, in actual practice more secondary terminals would be provided to allow for other functions of the control apparatus.

In Fig. 2A the first position toward the left is the "off" position which disconnects the entire control system (except a sustaining current necessary for the proper preservation of a rectifier to be hereafter described); the second position is the "control" or automatic position for normal use which position utilizes the circuit of Fig. 3; the third position from the left is the "heat indicate" position which utilizes the circuit of Fig. 4 to provide an indication of the rate of heat supply to the system; and the fourth position from the left is the "valve indicate" position which is utilized to provide an indication of the amount or percent which the control valve 13 (Fig. 1) is open.

Normally the master switch would also be provided with at least four other positions, these being a "clock" position for use with the time switch of Fig. 8 wherein the rate of heat supply is regulated as a function of time; a "manual open" position wherein the control valve motor operates continuously to open the control valve regardless of the indications given by the condition responsive elements 25 and 27; a "manual close" position wherein the control valve motor operates continuously to close the control valve; and a "calibrate" position for use in checking the adjustments of the control panel before the equipment is put into automatic operation. Inasmuch as the operation of the system for these last described functions is fully disclosed in the earlier patents hereinbefore mentioned the circuits are not shown here.

Figure 7:
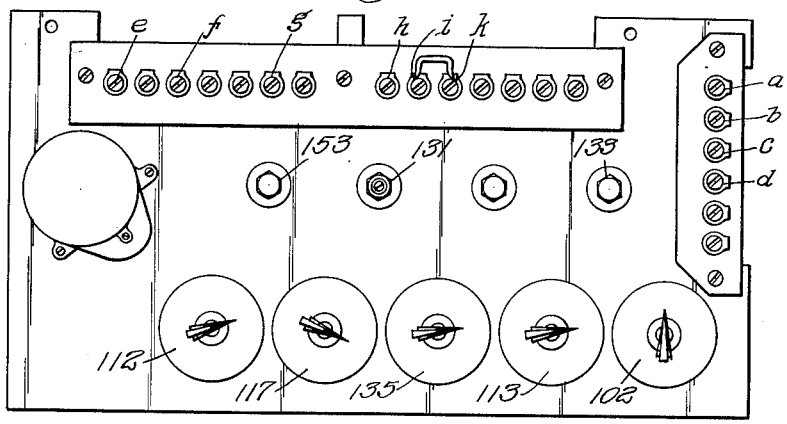
Fig. 7 is a front view of a portion of the inside of the control panel showing certain controls which are concealed therein.

In the control panel a pair of A. C. power leads 31 and 32 are connected to the primary 33a of a transformer designated generally at 33. A tapped secondary 33b of this transformer has one end connected by a lead 34 to the common terminal of deck VIII of the master switch. The three operative secondary terminals (excluding the "off" terminal) of this deck of the master switch are interconnected and these terminals are returned to the intermediate tap of the secondary 33b by means of a lead 35 which incorporates a timing motor 36. Another lead 37 connects the three operative secondary terminals of the deck VIII of the master switch with a terminal designated at a on the control panel. As shown in Figs. 2A and 7 the control panel is provided with a plurality of terminals, the operative ones for the circuits herein described being designated a, b, c, d, e, f, g, h, i, and k. The other end of the secondary 33 b is connected to the interconnected stationary contacts of two switches respectively associated with relays respectively designated 38 and 39, this connection being through a lead 40 which extends between said other end of the secondary and terminal i on the control panel; a jumper 41 which interconnects terminals i and k; and a lead 42 which extends between terminal k and the interconnected stationary contacts of said relay switches.

Another secondary 33c of the transformer 33 is connected to the A. C. terminals of a rectifier 43. Thus it will be seen that while the circuits which are energized from the secondary 33b are disconnected when the master switch is in "off" position, the rectifier continues to be connected across a source of voltage, this condition being necessary properly to preserve the rectifier.

A galvanometer relay designated generally at 45 is similar to that utilized in the systems of the patents earlier mentioned. Briefly the relay comprises a highly sensitive galvanometer relay coil 46 which upon energization swings an indicating needle 47 in one direction or the other depending upon the polarity of the potential across the coil. A pair of normally open switches 48 and 49 are carried on a movable assembly which is adapted to be lifted or moved toward the needle 47 periodically by a cam as disclosed in Patent 2,431,790 or by other means. If the galvanometer needle 47 has swung to the left (as the parts appear in Fig. 2A), upon the periodical movement of the switch mechanism the switch 48 will be closed for a brief period; while if the galvanometer needle has swung to the right the switch 49 will be closed upon such periodical movement. Obviously if there is not sufficient energizing voltage across the coil 46 to move the needle 47 from its center position as shown in Fig. 2A neither switch will be closed upon periodical movement of the switch mechanism. The common terminal of the switches 48 and 49 is connected by means of a lead 50 to the second or "control" terminal of deck IV of the master switch. The other terminal of switch 48 is connected by a lead 51 to one end of the operating coil of relay 38; and the other terminal of switch 49 is connected by a lead 52 to one end of the operating coil of relay 39. A common lead 53 connects the other end of each of said relay coils with the negative D. C. terminal of the rectifier 43. The positive terminal of the rectifier 43 is connected by means of a lead 54 to the common terminal of deck V of the master switch, and this common terminal is interconnected with the common terminal of deck IV of the switch. The movable contact of the switch of relay 38 is connected by a lead 55 to panel terminal b and the movable contact of the switch of relay 39 is connected by a lead 56 to panel terminal c.

The terminal box 17 shown in Fig. 2B has a plurality of terminals a', b', c', d', e', f', g' and h' which correspond in function to and are interconnected with similarly lettered terminals on the control panel. A pair of relays 60 and 61 are provided in the terminal box, one end of the coil of both of these relays being connected to the terminal a', and the terminals a and a' being connected by a lead 62. The other end of the coil 60 is connected to terminal b' and terminals b and b' are connected by a lead 63; while the other end of the coil of relay 61 is connected to terminal c' and terminals c and c' are connected by a lead 64. With this arrangement it will be seen that the relays 60 and 61 are energized as a function of energization of the relays 38 and 39 and effectively place the relays 38 and 39 in the terminal box which, as shown in Fig. 1, may be located a considerable distance from the control panel.

The stationary contacts of the switches associated with each of the relays 60 and 61 are connected together. The movable contact of the switch associated with relay 60 is connected by a lead 65 to one of the field coils of the reversible valve operating motor 14, while the movable contact of the switch associated with the relay 61 is connected by a lead 66 to another of the field coils of this motor, each of these last two mentioned connections incorporating a mechanically operated limit switch designated herein as 67 and 68 respectively. A transformer generally designated at 69 has a primary 69a which is adapted to be connected across a voltage source (conventional commercial 115 volt 60 cycle A. C. for example) in the building or other space where the terminal box is located, and a secondary 69b, one end of which is connected to the interconnected stationary contacts of the switches associated with the relays 60 and 61 and the other end of which is connected to the common connection of the motor field windings. Consequently, energization of one of the relays 60 or 61 (which energization is itself dependent upon energization of one of the relays 38 or 39) causes the motor 14 to operate and the direction of operation is dependent upon which of the aforementioned relays 60 or 61 is energized.

The effective removal of the motor controlling relays to the terminal box 17 has important advantages in many installations where the distance between the boiler plant or other central control point and the terminal box in the space to be heated is great. I have found that where this distance exceeds 1200 feet, if the motor 14 is operated directly from the panel in the boiler room or other central point the voltage drop in the power leads is so great that efficient and proper operation of the motor is not obtained. With the circuits above described the only power leads which extend between the control panel and the terminal box are utilized to supply current to operate the relays, and a voltage drop in these leads is of negligible importance. The motor current is supplied directly from the building where the terminal box is located and any voltage drop occasioned by excessively long leads is avoided.

Where the length of cable from the control panel to the control valve is less than 1200 feet the motor may be operated directly from the panel 19 thereby eliminating the need for the power supply connection to the primary 69a of transformer 69 in terminal box 17. In this event, transformer 69 and relays 60 and 61 in terminal box 17 are not used. Terminals a, b, and c on panel 19 are then connected to the windings of motor 14 so that relays 38 and 39 in panel 19 directly control the motor.

The step-by-step operation of the motor to open or close the control valve is exactly the same as that described in the earlier patents above referred to, and as in the structure of these earlier patents the motor operates the slider of a potentiometer which is in the automatic bridge circuit, this slider being connected to the motor through reduction gearing as described in the aforesaid patents. As shown in Fig. 2B this potentiometer 70 is located in the motor housing and is connected to the terminal box by means of leads 71, 72 and 73.

Figure 6:
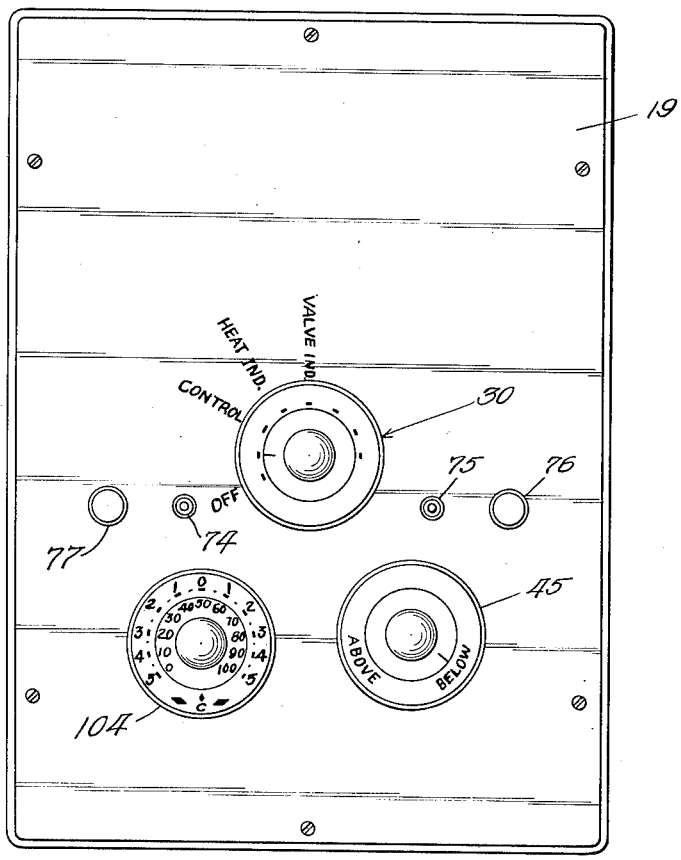
Fig. 6 is a front elevational view of the control panel.

As a part of the power circuits in the control panel 19 pilot lamps 74 and 75 are provided on the front of the control panel (see Figs. 2A and 6). The lamp 74 is connected across the coil of the relay 38 and is illuminated whenever the relay 38 is energized to operate the motor 14 to close the valve, and the lamp 75 is connected across the coil of the relay 39 and is illuminated whenever the relay 39 is energized to operate the motor 14 to open the valve. Fuses 76 and 77 are provided in the respective circuits of the control apparatus and the rectifier 43.

From the above description the operation of the power portion of the system may be seen. Assuming that the power leads 31 and 32 are connected to a source of A. C. voltage and that the knob 30 of the master switch 29 has been turned to the second or "control" position wherein the second secondary terminal of each deck of the master switch engages the common terminal of the respective deck, a circuit will be completed from the lower end of the secondary 33b through deck VIII of the master switch and terminals a and a' to one end of the coils of the relays 60 and 61. The circuit from the other end of relay coil 60 includes terminals b' and b and the normally open relay switch 38, while the return circuit of the relay coil 61 includes terminals c' and c to the normally open relay switch 39. The other elements of these normally open switches extend through a common lead to the other end of the secondary 33b.

Assuming further that the primary 69a of the transformer 69 is connected to a source of A. C. voltage, the motor will be operated in one direction or the other to close or open the valve 13 if either of the switches associated with the relays 60 and 61 is closed. These switches are both open so long as the relays 38 and 39 are not energized. One end of the coils of both relays 38 and 39 is connected directly to the negative terminal of the rectifier 43, and the other end of each of the relay coils 38 and 39 is conected to one of the switches 48 and 49, respectively, of the galvanometer relay 45, the circuit for the relay coils 38 and 39 being common from the other side of the switches 48 and 49 through deck IV of the master switch to the positive terminal of the rectifier.

In normal operation the movable assembly including the switches 48 and 49 is moved upwardly and then downwardly three times a minute. Consequently, if the galvanometer coil 46 has been energized by a voltage of polarity which causes the needle 47 to swing to the left the relay 38 will be energized briefly periodically at the rate of three times a minute and the periodic closing of the switch associated with this relay will in turn cause simultaneous periodic energization of relay 60. Closure of the switch associated with relay 60 will cause the motor 14 to operate periodically to close the valve and to move the slider of potentiometer 70. If the galvanometer needle 47 has swung to the right the operation is reversed and step-by-step operation of the motor occurs to open the valve and to move the potentiometer slider in the opposite direction. If the galvanometer needle is in the position shown, no motor operation occurs.

*Control responsive elements and terminal box connections*

As shown in Fig. 2B, and as more fully described in the patents earlier mentioned, the thermostatic elements in the heat balancer 25 comprise a lower temperature responsive resistor 78 which is in the path of air entering the lower opening of the heat balancer unit, and an upper temperature responsive resistor 79 which is in the path of air after it has been heated in the unit. One end of the resistor 78 is connected to terminal f' by means of a lead 80 and the other end of this resistor is connected to terminal a' by means of a lead 81. One end of the resistor 79 is connected to terminal e' by means of a lead 82 and the other end of this resistor is connected to terminal a' by means of a lead 82a. With this construction it will be seen that the lead 62 which connects terminal a of the control panel and terminal a' of the terminal box, and which may be 5,000 feet or more in length, not only serves as a power lead but concurrently acts as a common return for the circuit including the temperature responsive resistors 78 and 79. Since the lead is common to both these resistors lead compensation is preserved while the necessity of running separate wires of great length to each of these resistors is done away with. Thus at terminal a' of the terminal box the resistors 78 and 79 are connected together thereby completing a bridge branch with arms comprising resistors 78 and 79. Only one lead is required from the control panel to the arm junction a instead of separate leads to each of the arms.

The selector 27 which is mounted on the inside surface of the window in the space to be heated contains a temperature responsive resistor 83, and a balancing loop completed thru connector 84 is provided to obtain the necessary delicacy of balance in the resistance thermometer circuit. One end of the resistor 83 is connected by a lead 85 to terminal e' in the terminal box and the other end of this resistor is connected to terminal g' by a lead 86. On end of the connector 84 is connected to terminal f' in the terminal box by means of a lead 87 which incorporates a balancing resistor 88' for offsetting the nominal resistance of element 83, that is 88' is a fixed resistor not sensitive to temperature and is in the bridge arm opposite the arm which comprises resistor 83. The other end of connector 84 is connected by means of a lead 89 to terminal h' in the terminal box to complete the balancing loop. Thus resistors 83 and 88' are connected in opposite arms of a bridge branch. In this case separate leads to the two arms are provided from terminals g' and h' to enable potentiometer 102 in the panel to be connected at the arm junction of this bridge branch.

Terminal e in the control panel is connected to terminal e' in the terminal box by means of a lead 90 which is common throughout its length to the circuits of the resistors 79 and 83, thereby further lessening the number of long leads required without losing the effect of lead compensation. The lead 90 is also common to the circuit of the potentiometer 70, the lead 90 being connected at one end to a resistor 91' the other end of which is connected to the lead 71 which extends from one end of said potentiometer. Terminal f in the control panel is connected to f' in the terminal box by means of a lead 92, this lead being common throughout its length to the circuits of the resistors 78 and 88' and the balancing loop completed by connector 84, thus still further reducing the number of long leads while preserving the effects of lead compensation. Lead 92 is also common to the potentiometer circuit, being connected to one end of a resistor 93' the other end of which is connected to the lead 73 which extends to the other end of the potentiometer 70.

The terminals g and g' are interconnected by a lead 94 which connects in the terminal box with lead 86 and thus completes the circuit for the selector resistor 83; and terminals h and h' are interconnected by a lead 95 which connects with the lead 89 in the terminal box and thus completes the circuit for resistor 88' through the balancing loop and connector 84. Terminals d and d' are interconnected by a lead 96 which connects in the terminal box with the lead 72, this last mentioned lead being connected at its other end to the slider of the potentiometer 70.

Leads 80, 81, 82 and 82a form the cable 26 of Fig. 1; leads 85, 86, 87 and 89 form the cable 28 of Fig. 1; while leads 62, 63, 64, 90, 92, 94, 95 and 96 form the cable 18 of Fig. 1. Leads 71, 72, 73, 65, 66, and the lead from one terminal of transformer winding 69b to the common terminal of the field windings of motor 14 form cable 16 of Fig. 1. By utilizing certain of the long leads between the terminal box and the control panel as common leads for a plurality of circuits, including the utilization of the lead 62 as a common lead for portions of the power circuit and the control circuit simultaneously, a great reduction in the length of wire utilized is effected and the cable 18 may be of smaller size than has heretofore been necessary. This is made possible by locating certain fixed arm resistors in the terminal box so that pairs of arm resistors connected in separate bridge branches are located at or near the terminal box and then by interconnecting the bridge branches at the terminal box. Previously, separate leads have been provided from the bridge to each remotely located arm. In the system shown in Patent No. 2,431,790 for example, the cable between the control panel and the space to be heated must contain 14 leads, whereas in the installation herein described this cable contains only eight leads. Since the cable may be 5,000 or more feet long the saving in number of wires and cable size is of great practical value.

Automatic operation

Fig. 3 shows in simplified schematic form the bridge which is connected when the master switch is in its second position for "control" or automatic operation. The bridge will be described with reference to Fig. 3 and the circuits of the bridge will also be shown in Fig. 2. In Fig. 3 decks I, III, V, VI and VII of the master switch are illustrated, only one secondary terminal being shown on each of these decks in the drawings. It will be understood that this is the secondary terminal at the "control" position.

The bridge comprises a plurality of arms, certain of these arms being connected together to provide a plurality of branches which are all connected in parallel with the control galvanometer relay 45, this galvanometer being connected by wires 100 and 101 across bridge terminals X and Y. At the upper side of the bridge a pair of arms E and E' are connected in series to form one bridge branch. The arm E incorporates the selector temperature responsive resistor element 83 and the arm E' incorporates the balancing loop with connector 84 and the fixed resistor 88'. These arms are connected together in series through a potentiometer 102. Referring for a moment to Fig. 2 it will be seen that the arms E and E' include portions in the control panel, in the terminal box and in the selector 27, and that the terminal e is electrically the same as the bridge terminal X, while the terminal f is electrically the same as the bridge terminal Y, these bridge terminals being shown schematically in heavy lines for better clarity. In Fig. 2 the branch formed by the arms E and E' may be seen to comprise the lead 90 extending from bridge terminal X in the control panel, leads 85 and 86 incorporating the temperature responsive resistor 83, lead 94, potentiometer 102, a lead 103 connecting said potentiometer with terminal h, lead 95, leads 89 and 87 incorporating the balancing loop with connector 84 and the resistor 88', and lead 92 returning to bridge terminal Y in the control panel.

Referring again to Fig. 3 another pair of arms F and F' in the negative portion of the bridge include the respective heat balancer thermostatic elements 78 and 79. The arms F and F' are connected in series to form another bridge branch, and this latter branch is connected across the bridge terminals X and Y in parallel with the branch formed by the arms E and E'. Referring briefly to Fig. 2 the arms F and F' may be seen to comprise the lead 90 extending from terminal e (bridge terminal X) of the control panel, the leads 82 and 82a incorporating the temperature responsive element 79, the leads 81 and 80 incorporating the temperature responsive element 78, and the lead 92 returning to the bridge terminal Y in the control panel.

On the lower side of the bridge a pair of arms G and G' form another bridge branch in the negative portion of the bridge. The arm G extends from the bridge terminal X to one end of a potentiometer 104 and incorporates a fixed resistor 105. The arm G' extends from the other end of the potentiometer 104 to the bridge terminal Y and incorporates a fixed resistor 106. Referring to Fig. 2A, this bridge branch is seen to be contained completely within the control panel.

Another branch completely within the control panel comprises arms H and H'. The arm H extends from the bridge terminal X to one end of a potentiometer 107 and incorporates a fixed resistor 108, and the arm H' extends from the other end of the potentiometer 107 to the bridge terminal Y and incorporates a fixed resistor 109.

Arms I and I' are series connected to provide still another bridge branch, the arm I being connected between the bridge terminal X and one end of the potentiometer 70 and incorporating the fixed resistor 91' while the arm I' extends between the other end of the potentiometer 70 to the bridge terminal Y and incorporates the fixed resistor 93'. This circuit includes lead 90 which extends from terminal e, leads 71 and 73 which incorporate resistor 91', potentiometer 70 and resistor 93', and lead 92 which extends back to bridge terminal Y at the control panel.

In the operation of the apparatus it will be seen that when the bridge is in balance there is no current flow through the galvanometer relay 45 and consequently the modulation of the valve remains constant. However, should a change in the control temperatures cause a change in the resistance of the element 83 the bridge would become unbalanced and would remain unbalanced until corrected by a resistance differential between the resistors 78 and 79 and/or a change in the setting of potentiometer 70. This resistance differential may be caused by a change in the heat output of the system, this heat output being controlled by the valve 13 of Fig. 2, and any changes in the modulation of this valve are reflected in the setting of the potentiometer 70, the sliding arm of which is moved by the motor 14.

The negative terminal of the rectifier 43 is connected to the common terminal of deck III of the switch 29 by a lead 110, and the "control" secondary terminal of deck III is connected by a lead 111 to the slider of a potentiometer 112 and to one end and to the movable element of a potentiometer 113 which is connected as a variable resistance or rheostat. The potentiometer 112 is the temperature ratio adjustment when the system is connected for automatic operation and is shown in Fig. 7 as having its control knob concealed within the control panel. This potentiometer preferably is calibrated in the degrees change in the temperature difference between the elements 78 and 79 per degree change in temperature of the selector 27, and for normal operation this is set to about 2.2 degrees. As may be seen in Fig. 3 the position of the sliding element of the potentiometer 112 determines the ratio of current flow between the branches E, E' and F, F'. One end of the potentiometer 112 is connected to the slider of potentiometer 102, which is the cut-off temperature adjustment control and has its control knob concealed within the panel as shown in Fig. 7. The potentiometer 102 preferably is calibrated in the temperature of the window pad of the selector 27 above which the control valve 13 will be closed to shut off the heat supply if the system is set for what has been found to be a normal temperature. The other end of the potentiometer 112 is connected by a lead 114 to deck VII of the master switch and through said deck through the leads 37 and 62 to the midpoint between the resistors 78 and 79 in the terminal box.

The proportion of the current which flows through potentiometer 112 in the circuits above described to the total current is a function of the setting of the rheostat 113, this rheostat being used to vary the amount of effect a compensator, later to be described, has in the bridge circuit. The other end of the rheostat 113 is connected to deck I of the master switch by a lead 115 and is connected through said deck to the slider of the potentiometer 104 by means of a lead 116. This last mentioned potentiometer is the compensator above referred to and is the main operating control member of the automatic arrangement, being shown on the outside of the control panel in Fig. 6. The compensator is utilized to adjust the rate of steam supply to satisfy unusual or particular requirements. Under automatic operation the control proportions the opening of the control valve to maintain a balance between the heat demand as measured by the selector 27 and varied by the setting of the compensator dial knob, and the heat supply as measured by the heat balancer 25. Adjustments of the potentiometers 112 and 102 which are concealed in the control panel permit settings to adapt the control to the particular building and the climate and insure the proper amount of heat in both mild and cold weather.

The positive side of the bridge includes the branches H, H' and I, I', and current flows through these branches in proportion to the ratio of the resistances in the arms of one branch to the resistances of the arms of the other branch. A rheostat 117 is connected between the sliders of the respective potentiometers 107 and 70, one end of this rheostat being connected directly to the slider of the potentiometer 107 by means of a lead 118 and the other end of the rheostat being connected to a lead 119 which extends through deck VI on the master switch. The common terminal of deck VI is connected by a lead 120 with terminal d on the control panel, which in turn is connected to the slider on the motor operated potentiometer 70 by means of the leads 96 and 72.

The rheostat 117 determines the amount of change in the opening of the control valve if the temperature difference between the heat balancer resistances 78 and 79 varies from the value corresponding to the rate of heat supply called for by the selector 27. This effect is obtained since the proportion of current flow through the potentiometer 70 (and consequently the effect of any given change in the setting of the potentiometer 70) is determined by the setting of the rheostat 117 since the slider of the potentiometer 107 in the arms H, H' is connected directly to the positive terminal of the rectifier while the slider of the motor controlled potentiometer 70 is connected to said positive terminal through the variable resistance of the rheostat 117. This last mentioned connection to the positive terminal of the rectifier is made by means of a lead 120 to deck V of the master switch and thence to the positive terminal of the rectifier through lead 54.

The circuit above described places the compensator in the negative side of the bridge and the proportion of the total current which flows through the compensator 104 and through the branches E, E' and F, F' in parallel is solely a function of the setting of the range adjustment control 113, whereas in earlier circuits the compensator was in the positive side of the bridge and a double potentiometer arrangement was used including the compensator potentiometer and the potentiometer which determined the proportion of the current through the selector branch as opposed to the heat balancing branch.

*Heat indicate circuits*

The heat indicate bridge which is connected when the master switch is in its third position is shown in Fig. 4. The purpose of this circuit arrangement is to determine by a null reading of the galvanometer needle 47 the percentage of heat emission from the heat balancer arrangement.

The bridge utilizes decks I, III, V and VII of the master switch and comprises arms F and F' connected in series between the bridge terminals X and Y, said arms having therein the respective temperature responsive resistors 79 and 78. Another pair of arms K and K' are series connected to form another bridge branch in parallel with the bridge branch comprising the arms F, F'. The arm K includes a fixed resistor 130 and extends from the bridge terminal X to one terminal of a potentiometer 131 connected as a fixed resistor with its slider open circuited. The arm K' extends from the other end of the potentiometer resistor 131 to the bridge terminal Y and incorporates a fixed resistor 132. These circuits may be traced in Fig. 2A near the upper portion of said figure. Another branch of the bridge includes the arms G and G' with the resistors 105 and 106 and the compensator potentiometer 104. The positive side of the bridge comprises a branch including arms L and L'. Arm L extends from bridge terminal X to one end of a potentiometer 133 and incorporates the fixed resistor 108. Arm L' extends from the other end of the potentiometer 133 and incorporates the fixed resistor 109. As may be seen in Fig. 2A the potentiometers 107 and 133 are connected in parallel. However, since the variation of this resistance network (which includes additional resistors shown in Fig. 2A but not yet described) is solely dependent upon movement of the slider of potentiometer 107 in the automatic circuit of Fig. 3 and is solely dependent upon the position of the slider of the potentiometer 133 in the heat indicate bridge of Fig. 4, these respective bridges are shown in simplified form in Figs. 3 and 4 as including only the potentiometer which is varied in the particular circuit illustrated.

In the bridge of Fig. 4 current flows from the negative terminal of the rectifier through lead 110 to the common terminal of deck III of the master switch and through lead 134 to the slider of a potentiometer 135. This potentiometer is the range adjustment for the heat indicate bridge and is used for matching the range of the compensator 104 with the range of variation of the difference in the resistance between the heat balancer resistors 78 and 79. From Fig. 4 it can be seen that the setting of potentiometer 135 determines the proportion of the total current which will flow through branch F, F' and the proportion which will flow through the network including branches K, K' and G, G' in parallel. The current in the lead 134 divides according to the setting of the potentiometer 135, one portion flowing to the junction of the arms F and F' through deck VII of the master switch. In Fig. 2A one end of the potentiometer 135 is connected to deck VII of the master switch and common terminal of deck VII is connected to the junction between the resistors 78 and 79 by means of leads 37 and 62. The other portion of the current from the lead 134 is divided between bridge branches K, K' and G, G'. Referring again to Fig. 2A, the other end of the potentiometer 135 is connected to the common terminal of deck I of the master switch through lead 116 and on the other side of deck I a lead 137 extends to the junction between resistor 130 and one end of potentiometer 131 which is here connected as a fixed resistor since its slider is connected to the fourth terminal of deck V of the master switch which now is an open switch. A lead 140 branches from the lead 116 and carries a portion of the current to the slider of the compensator potentiometer 104.

The positive return for the bridge is through the bridge branch L, L', a lead 141 extending between the slider of the potentiometer 133 and deck V of the master switch, this deck being connected to the positive terminal of the rectifier by lead 54. The control knob for the compensator is provided with a second scale which is preferably calibrated from zero to 100. By turning the control knob of the compensator dial to balance the bridge and bring the needle 47 of the galvanometer relay to the center position the percent of heat emission from the heat balancer may be read directly from the compensator dial, and this reading is an indication of the rate of heat supplied to the system.

In earlier arrangements of this type, for example in the arrangement shown in Fig. 9 of Patent No. 2,362,977, a variable resistance was necessary in the bridge arms. Since dirt, corrosion, loose contact, etc. often changed the value of this variable resistance from its calibrated reading the indication given by the bridge circuit was often inaccurate. In the circuit of the heat indicate bridge shown in Fig. 4 of this application there is no variable resistor in the junction of the arms of any of the bridge branches.

Valve indicate circuits

Additional improvements have been made in the bridge circuit for the "valve indicate" position of the master switch. In earlier constructions the bridge for this circuit required variable resistors in each arm of one of the bridge branches, and these variable resistors were ganged on a single control. Consequently, any small change in either one of the variable resistors caused by dirt, corrosion or loose contact of the slider would throw the bridge out of balance independently of the conditions to be measured. In the bridge of Fig. 5 these disadvantages are overcome.

The bridge of Fig. 5 comprises a branch connected between bridge terminals X and Y and formed from series connected arms M and M'. Arm M includes resistor 108 and arm M' includes resistor 109, while the juncture of said arms may be considered as being through series connected resistors 150 and 151. Reference to Fig. 2A will show that resistors 150 and 151 are connected in parallel with potentiometers 107 and 133. However, since the sliders of potentiometers 107 and 133 are open circuited when the master switch is in "valve indicate" position the feed of the circuit is through the connecting point between resistors 150 and 151, and they alone are shown in the simplified schematic diagram of Fig. 5.

Another bridge branch connected in parallel with the branch M, M' is formed from the arms K and K', the arm K incorporating resistor 130 and arm K' incorporating resistor 132, and these arms being joined through the resistance of potentiometer 131. The branch K, K' is connected in the positive side of the bridge.

Another bridge branch in the negative side of the bridge comprises arms G and G' including resistors 105 and 106 and compensator potentiometer 104. The bridge is completed by another branch in the positive side including the arms I and I', said arms being series connected between bridge terminals X and Y and incorporating resistor 91', motor operated potentiometer 70 and resistor 93' in series.

Current from the negative terminal of the rectifier flows through deck III of the master switch to the slider of a potentiometer 153. Reference to Fig. 2A will show this circuit as comprising the lead 110 to the common terminal of deck III of the master switch and a lead 154 from deck III to the slider of potentiometer 153. One end of potentiometer 153 is connected by a lead 155 (Fig. 2A) to the juncture between resistors 150 and 151 and the other end of the potentiometer 153 is connected to the slider of the compensator potentiometer 104. This last mentioned connection comprises a lead 156 extending to deck I of the master switch and the leads 116 and 140 from the common terminal of deck I of the master switch to the slider of the potentiometer 104. The potentiometer 153 is the range adjustment for the valve indicate position and is for matching the range of the compensator dial with that of the control valve. This function of potentiometer 153 is apparent from Fig. 5 since the potentiometer determines the proportion of the total current which flows through the compensator without affecting the proportion of the current which flows through the motor operated potentiometer 70. Consequently, the setting of potentiometer 153 determines the amount of effect movement of the compensator has upon the balance of the bridge and permits matching the range of compensator dial with the effect of the range of movement of the potentiometer 70.

The positive side of the bridge, as above noted, comprises two branches K, K' and I, I'. In the branch K, K' the slider of the potentiometer 131 is connected to the positive terminal of the rectifier through a lead 160 which extends to deck V of the master switch. The common terminal of the master switch is connected to the positive rectifier terminal by lead 54. The potentiometer 131 is the centering adjustment for this valve indicate bridge and is used for initially indexing the compensator dial with the opening of the control valve, since the setting of potentiometer 131 affects the balance of this portion of the bridge for any given position of the motor operated potentiometer 70.

The other positive bridge branch I, I' is connected to the positive terminal of the rectifier 5 through leads 72, 96 and 120 which connect the slider of the potentiometer 70 with the common terminal of deck VI of the master switch, and lead 161 which connects decks VI and V of the master switch.

With the master switch in valve indicate position the knob of the compensator potentiometer 104 may be turned to balance the bridge and bring the needle 47 of the galvanometer relay to center position. The percentage of opening of the control valve may now be read directly from the second or percentage scale earlier referred to on the compensator dial.

It will be seen from a comparison of Figs. 3, 4 and 5 that the bridge branch G, G' including the compensator potentiometer 104 is used in all three bridges described. In circuits heretofore devised it was necessary to utilize separate resistances in the heat indicate and valve indicate bridges as well as to provide an arrangement in the control or automatic bridge in which the compensator was ganged with another potentiometer.

As a further advantage of the system illustrated and described herein it should be pointed out that the construction and arrangement of the circuits is such that when the distance between the boiler room or other central control point and the space to be heated is small, the terminal box may be completely dispensed with and the connections may be made from the remotely located units directly to the panel 19. In this event, of course, the features of utilizing common leads and the provision of the separate transformer and other elements in the terminal box are eliminated. However, it has been found that when the distances are quite short so that the amount of wire used is not excessive it is economically advantageous to eliminate the terminal box.

In this event the relays 38 and 39 control the motor 14 directly, terminals a, b and c on the panel 19 being connected to the windings of the motor. The other elements of the system are also connected directly to the control panel, lead 82 being connected to terminal e, lead 82a being connected directly to terminal m, lead 85 being connected directly to terminal n, lead 86 being connected directly to terminal g, lead 80 being connected directly to terminal f, lead 81 being directly connected to terminal v, lead 87 being connected directly to terminal r, and lead 89 being directly connected to terminal h. Similarly the leads 71, 72 and 73 from the potentiometer 70 are connected directly to the respective terminals o, d and p. Resistors 88, 91 and 93 are provided in the control panel and are connected respectively to terminals r, o and p on the control panel. These resistors are out of the circuit when the terminal box is used, but replace resistors 88', 91' and 93' when the terminal box is eliminated.

Time switch

The panel 19 of Fig. 2A is also adapted for utilization with the time switch shown schematically in Figs. 8 and 9. When so used the system provides an improved completely automatic means of controlling all phases of the operation of a heating system. The time switch provides an arrangement whereby the heat supply is reduced during the night and is accelerated during the morning "heatup" period, and during the day the system supplies a normal amount of heat.

Referring to Fig. 8 the time switch is a conventional two circuit type device comprising a synchronous motor driven clock mechanism 170 having a conventional lever arrangement which may be set to operate switches 171 and 172 independently of each other at any chosen time. Inasmuch as switch operating mechanisms of this type are conventional the mechanism and the switches are shown only schematically.

Referring to Figs. 8 and 9, a pair of networks including fixed and variable resistances are arranged to form a bridge branch between terminals x and y of the time switch, said terminals x and y being adapted to be connected to respective terminals s and t on the control panel 19 in order to connect the time switch bridge branch across bridge terminals X and Y, this arrangement when connected being similar to bridge branch G, G' including the compensator as shown in Fig. 3. When the terminals x and y of the time switch are connected to the terminals s and t of the control panel it will be seen that the bridge branch includes a fixed resistor 173, two variable resistors 174 and 175 and another fixed resistor 176 all connected in series. The adjustable resistance at the center of the branch is divided equally between the two variable resistances, of which 174 is the "heatup" control and 175 of which is the "night" control, instead of being contained in a single resistance as at 104 in Fig. 3. The "night" resistance 175 can be set only to call for a reduction in heat and the "heatup" resistance 174 can be set only to call for an increase in heat, whereas the compensator potentiometer 104 can be set for a heat supply either above or below the normal.

The current lead from the rectifier 43 to the bridge branch just described includes terminal z of the time switch which is connected to terminal u of the control panel. Referring to Fig. 2A terminal u is connected by a lead 177 to deck II of the master switch 29. The common terminals of decks II and III of this switch are interconnected and are connected to the negative terminal of the rectifier 43 by lead 110. Current from this negative terminal is fed to the bridge branch through either one of the switches 171 or 172. For night operation the clock mechanism 170 closes switch 172, connecting the current supply to the slider of potentiometer 175 so that a reduced rate of heat supply is furnished depending upon the setting of the slider.

During the morning "heatup" period the clock mechanism 170 opens switch 172 and closes switch 171 so that the current supply is connected through switch 171 and through a limit thermostat 178 to the slider of the potentiometer 174 so that an accelerated heat supply is delivered depending upon the setting of the potentiometer 174. When the switch of the limit thermostat 178 opens as the space to be controlled becomes heated to the proper temperature, or when the clock mechanism opens switch 171 to end the heatup period, the current supply through this bridge branch is disconnected and the normal controls may be utilized to operate the system.

While I have shown and described certain embodiments of my invention, it is to be understood that it is capable of many modifications. Changes, therefore, in the construction and arrangement may be made without departing from

I claim:

1. In a balanced resistance type temperature control system having a control panel located remotely from the space to be controlled, a temperature measuring resistance bridge, comprising: a current responsive device in the panel; a first plurality of resistance elements in said panel; conductors for interconnecting said elements and said device to form complete bridge branches connected in parallel with each other and with said device; a second plurality of resistance elements comprising fixed resistors located at the space to be controlled; a plurality of temperature-responsive resistances located at the space to be controlled; and conductors for interconnecting said second plurality of resistance elements, said temperature-responsive resistances and said device to form complete bridge branches connected in parallel with each other, with said first mentioned branches and with said device to form the complete bridge, portions of said last mentioned conductors forming extensions of the juncture of said first mentioned branches and being common to more than one of said resistance elements and temperature-responsive resistances utilizing a minimum number of conductors and eliminating any need for lead compensation which would otherwise unbalance the bridge.

2. In a balanced resistance type temperature control system having a motor actuated valve for controlling the supply of heat and a circuit for controlling the operation of the motor including a current responsive device in an electrical bridge comprising a plurality of bridge branches connected in parallel with each other and with said device, apparatus for controlling the motor as a function of time, comprising: a bridge branch connected in parallel with the device, said branch including two potentiometers connected in series, each potentiometer having an adjustable contact; a source of current; a feed circuit having a pair of branch leads, one being connected to the adjustable contact of each potentiometer; conductors for connecting said source of current to said feed circuit; a normally open time switch in each of said branch leads; and a timing mechanism for operating said switches periodically to connect the adjustable contact of one potentiometer to said source of current at regular time intervals.

3. In a balanced resistance type temperature control system having a motor actuated valve for controlling the supply of heat and a circuit for controlling the operation of the motor including a current responsive device in an electrical bridge comprising a plurality of bridge branches connected in parallel with each other and with said device, means for controlling the motor as a function of time and temperature, comprising: a bridge branch adapted to be connected in parallel with the device, said branch including two potentiometers connected in series, each potentiometer having an adjustable contact; a source of current; a feed circuit having a pair of branch leads, one being connected to the adjustable contact of each potentiometer; conductors for connecting said source of current to said feed circuit; a normally open time switch in each of said branch leads; a thermostat in one of said branch leads, said thermostat having a normally closed temperature switch which opens in response to temperature changes; and a timing mechanism for operating said time switches selectively to connect the adjustable contact of one potentiometer to said source of current at regular time intervals.

4. In a balanced resistance type temperature control system for a heating system having a source of heat and a remotely located space the temperature of which is to be controlled, heat supply regulating means located adjacent the remote space including an electric motor, a source of electrical energy for powering said motor located near said motor to require short power leads only, a pair of relays located adjacent said motor each having a switch interposed between said motor and said source of electrical energy, a potentiometer having a slider adapted to be driven by said motor, a pair of heat responsive bridge elements located at the remote space, a temperature responsive resistor and a balancing loop located at the remote space, a control panel located remotely from the space the temperature of which is to be controlled, leads connecting said control panel and said relays including a lead to the common point of said relays and to the common point of said heat responsive bridge elements, a single lead connecting said control panel and one of said pair of heat responsive bridge elements, said temperature responsive resistor and one end of said potentiometer, and another lead connecting said control panel and the other one of said pair of heat responsive bridge elements, said balancing loop and the remaining end of said potentiometer.

5. In a balanced resistance type temperature control system for a heating system having a source of heat and a remotely located space the temperature of which is to be controlled, heat supply regulating means located adjacent the remote space including an electric motor, a source of electrical energy for powering said motor located near said motor to require short power leads only, a pair of relays located adjacent said motor each having a switch interposed between said motor and said source of electrical energy, a potentiometer having a slider adapted to be driven by said motor, a pair of heat responsive bridge elements located at the remote space, a temperature responsive resistor and a balancing loop located at the remote space, a control panel located remotely from the space the temperature of which is to be controlled, leads connecting said control panel and said relays including a lead to the common point of said relays and to the common point of said heat responsive bridge elements, a single lead connecting said control panel and one of said pair of heat responsive bridge elements, said temperature responsive resistor and one end of said potentiometer, another lead connecting said control panel and the other one of said pair of heat responsive bridge elements, said balancing loop and the remaining end of said potentiometer, and an individual lead respectively between the slider of said potentiometer, the remaining end of said temperature responsive resistor and the remaining end of said balancing loop and said control panel.

6. In a balanced resistance type temperature control system for a heating system having a source of heat and a remotely located space the temperature of which is to be controlled, heat supply regulating means located adjacent the remote space including an electric motor, a potentiometer having a slider adapted to be driven by said motor, a pair of heat responsive bridge elements located at the remote space, a temperature responsive resistor and a balancing loop located at the remote space, a control panel located remotely from the space the temperature of which is to be controlled, a first lead extending from said control panel to the common point of said heat responsive bridge elements, a second lead connecting said control panel and the remaining end of one of said pair of heat responsive bridge elements, one end of said temperature responsive resistor and one end of said potentiometer, a third lead connecting said control panel and the remaining end of the remaining one of said pair of heat responsive bridge elements, one end of said balancing loop and the remaining end of said potentiometer, a fourth, a fifth, and a sixth lead connecting said control panel respectively to the slider of said potentiometer, the remaining end of said temperature responsive resistor, and the remaining end of said balancing loop.

7. In a balanced resistance type temperature control system for a heating system having a source of heat and a remotely located space the temperature of which is to be controlled, heat supply regulating means located adjacent the remote space, a pair of heat responsive bridge elements, a temperature responsive resistor and a balancing loop all located at the remote space, a potentiometer having a movable slider located adjacent the remote space, a fixed resistor located adjacent the remote space and connected in series with said balancing loop to form therewith one arm of a bridge branch, a second and a third fixed resistor located adjacent the remote space and connected in series with said potentiometer on opposite sides of said potentiometer, a control panel located remotely from the space the temperature of which is to be controlled, and means connecting said control panel and the remotely located elements comprising a first lead connected to the common point of said heat responsive bridge elements, a second lead connected to the remaining end of one of said pair of said heat responsive bridge elements, one end of said temperature responsive resistor and the remaining end of one of the fixed resistors in series with said potentiometer, a third lead connected to the remaining end of the remaining one of said pair of heat responsive bridge elements, to the remaining end of said fixed resistor in series with said balancing loop and to the remaining end of the remaining fixed resistor in series with said potentiometer, and fourth, fifth and sixth leads connected respectively to the slider of said potentiometer, the remaining end of said temperature responsive resistor and the remaining end of said balancing loop.

8. In a balanced resistance type temperature control system for a heating system having a source of heat and a remotely located space the temperature of which is to be controlled, a control valve located adjacent the remote space, an electric motor for operating said valve located adjacent the same, a control panel located remotely from the space the temperature of which is to be controlled, a control circuit including a pair of temperature responsive impedance bridge elements located at the space the temperature of which is to be controlled, power leads extending from said control panel to said motor to control the operation of said motor, and a lead common at one end to said temperature responsive elements and at the other end connected to one of the power leads for said motor.

9. In a balanced resistance type temperature control system for a heating system having a source of heat and a remotely located space the temperature of which is to be controlled, a control valve located adjacent the space the temperature of which is to be controlled, an electric motor for operating said valve located adjacent the same, a source of electrical energy for powering said motor located near said motor to require short power leads only, a control panel located remotely from the space the temperature of which is to be controlled, a control circuit including resistance bridge elements in said panel and a pair of heat responsive bridge elements located at the space the temperature of which is to be controlled, said heat responsive bridge elements forming the arms of one branch of a bridge circuit, a pair of relays located adjacent said motor each having a switch interposed between said motor and said source of electrical energy, leads connecting said control panel and said relays for controlling the application of electrical energy to said motor through the medium of said relays including a lead common to said relays, and an extension of said common lead connected to the common point of said pair of heat responsive bridge elements.

10. In a balanced resistance type temperature control system for a heating system having a source of heat and a remotely located space the temperature of which is to be controlled, heat supply regulating means located adjacent the remote space, a control panel located remotely from the space the temperature of which is to be controlled and a bridge network for controlling said heat supply regulating means comprising a first bridge branch including a pair of heat responsive bridge elements connected in series and located at the remote space, a second bridge branch connected in parallel with said first branch and including a temperature responsive resistor, a balancing loop, both located at the remote space, and a potentiometer located at said control panel, said potentiometer being incorporated at the juncture of said resistor and balancing loop, a third bridge branch connected in parallel with said first and second branches comprising a pair of resistors located at the control panel and a potentiometer in series with said resistors and incorporated at the juncture point of said resistors, a fourth and a fifth bridge branch connected in parallel with said first, second and third branches, a source of direct current potential for said network having its positive terminal connected to supply potential to said fourth and fifth branches and its negative terminal connected to supply potential to said first, second and third branches, a range adjustment potentiometer incorporated in the connection between said source of potential and said first three bridge branches to control the proportion of current flow between said third branch and said first and second branches, and means connected across the common terminals of said branches to detect unbalance in said bridge network.

11. In a balanced resistance type temperature control system for a heating system having a source of heat and a remotely located space the temperature of which is to be controlled, a control panel located remotely from the space the temperature of which is to be controlled, and a bridge network for obtaining an indication of the heat supplied comprising a first bridge branch including a pair of heat responsive bridge elements located at the remote space, a second bridge branch connected in parallel with said first branch and composed only of a pair of fixed resistors and a potentiometer at the juncture of said resistors, said potentiometer having its slider open circuited to serve as a fixed resistor, a third branch connected in parallel with said first and second branches including a pair of fixed resistors and a potentiometer forming the juncture point of said resistors, a fourth bridge branch including a pair of fixed resistors and a potentiometer forming the juncture of said resistors, all of the elements of said second, third and fourth branches being located in said control panel, a source of potential for said bridge network including a direct current source having its positive terminal connected to said fourth branch only, the negative terminal of said potential being connected to the first three branches with the connection from said negative terminal to said branches including a potentiometer adjustable to vary the proportion of current flow between said first branch and said second and third branches, and means connected across the common terminals of said branches for indicating balance or unbalance of said network.

12. In a balanced resistance type temperature control system for a heating system having a source of heat and a remotely located space the temperature of which is to be controlled, heat supply regulating means located adjacent the remote space including an electric motor for adjusting said regulating means, a control panel located remotely from the space the temperature of which is to be controlled, and a bridge network for obtaining an indication of the adjustment of said heat supply regulating means comprising a first bridge branch including a pair of fixed resistors and a potentiometer connected to form the juncture of said resistors, said resistors and potentiometers being located adjacent the remote space and the potentiometer having a slider movable by said motor in accordance with the adjustment of said heat supply regulating means, a second bridge branch connected in parallel with said first branch and including a pair of resistors and a potentiometer forming the juncture of said resistors all located at said control panel, a third and a fourth bridge branch each including fixed resistors, a source of D. C. potential for the bridge network having its positive terminal connected to said first and second branches and its negative terminal connected to said third and fourth branches, the connection between the negative terminal of said source of potential and said third and fourth branches including a potentiometer for controlling the proportion of current flowing between said branches, and means connected across the common terminals of said branches for indicating balance or unbalance of said network.

EVERETT W. WERTS.

REFERENCES CITED

The following references are of record in the file of this patent:

UNITED STATES PATENTS

| Number | Name | Date |
| --- | --- | --- |
| 2,136,559 | Miller | Nov. 15, 1938 |
| 2,362,977 | Crosthwait et al. | Nov. 21, 1944 |
| 2,431,790 | Crosthwait et al. | Dec. 2, 1947 |
| 2,495,844 | Hornfeck | Jan. 31, 1950 |

FOREIGN PATENTS

| Number | Country | Date |
| --- | --- | --- |
| 527,349 | Great Britain | Oct. 7, 1940 |